United States Patent [19]

Anderson

[11] 4,390,272

[45] Jun. 28, 1983

[54] PHOTOGRAPHIC DISTORTION METHOD AND APPARATUS

[76] Inventor: James Anderson, 12 East Rd., Scarborough, Ontario, Canada, M1N 2A1

[21] Appl. No.: 288,049

[22] Filed: Jul. 29, 1981

[51] Int. Cl.³ ............................................. G03B 27/10
[52] U.S. Cl. ...................................... 355/84; 355/52; 355/103; 355/132
[58] Field of Search ................... 355/52, 84, 103, 77, 355/132

[56] References Cited

U.S. PATENT DOCUMENTS

| | | | |
|---|---|---|---|
| 2,155,094 | 4/1939 | Kiessling | 355/52 X |
| 2,830,491 | 4/1958 | Domeshek | 355/52 X |
| 3,126,809 | 3/1964 | Adams et al. | 355/52 |
| 3,158,077 | 11/1964 | Miller et al. | 355/103 |
| 3,374,724 | 3/1968 | Torres | 355/52 X |
| 3,401,616 | 9/1968 | Cross | 355/52 X |
| 3,445,165 | 5/1969 | Dubbs | 355/84 |
| 3,767,301 | 10/1973 | Solo | 355/52 |
| 3,861,797 | 1/1975 | Nishida et al. | 355/52 |
| 3,927,942 | 12/1975 | Byers | 355/84 |
| 3,992,094 | 11/1976 | Adcock | 355/52 X |
| 4,008,959 | 2/1977 | Parsons | 355/52 X |
| 4,105,328 | 8/1978 | Wasson et al. | 355/52 X |
| 4,238,156 | 12/1980 | Parsons | 355/52 |
| 4,268,166 | 5/1981 | Byers | 355/84 |
| 4,324,489 | 4/1982 | Byers | 355/84 |

*Primary Examiner*—Richard A. Wintercorn
*Attorney, Agent, or Firm*—Westell & Hanley

[57] ABSTRACT

A method and apparatus for obtaining a distorted photographic reproduction from a negative photographic image, in which a sheet of photosensitive printing paper is attached to a planar surface of a table, the image negative is placed over the paper and a slitted mask is placed over the image negative. The image negative and the mask are moved laterally relative to one another and to the paper while the mask is exposed to a light source. To obtain a circular reproduction the mask is held stationary and the printing paper is rotated about an axis intersecting the slit while the image negative is moved laterally with respect to the slit.

10 Claims, 14 Drawing Figures

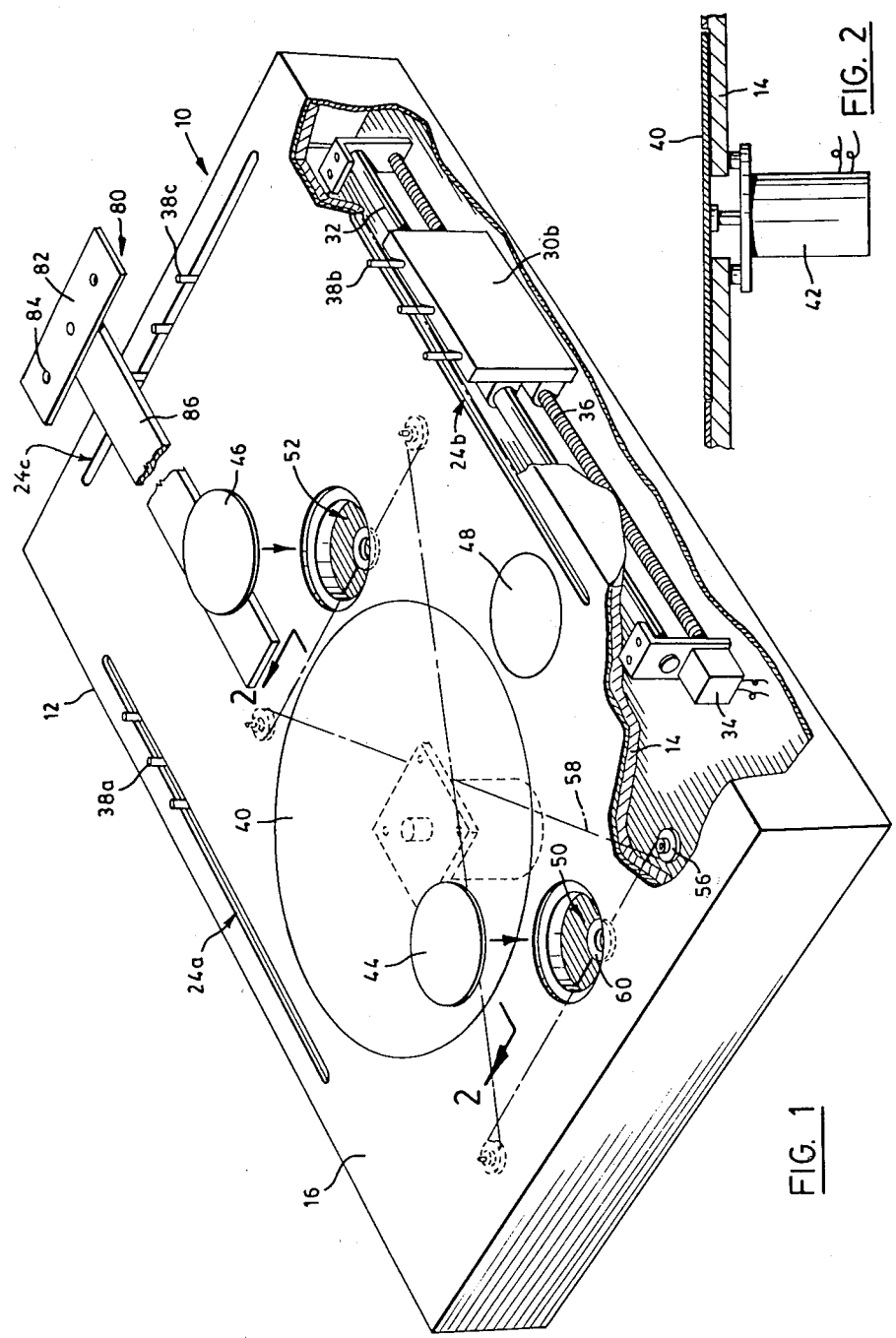

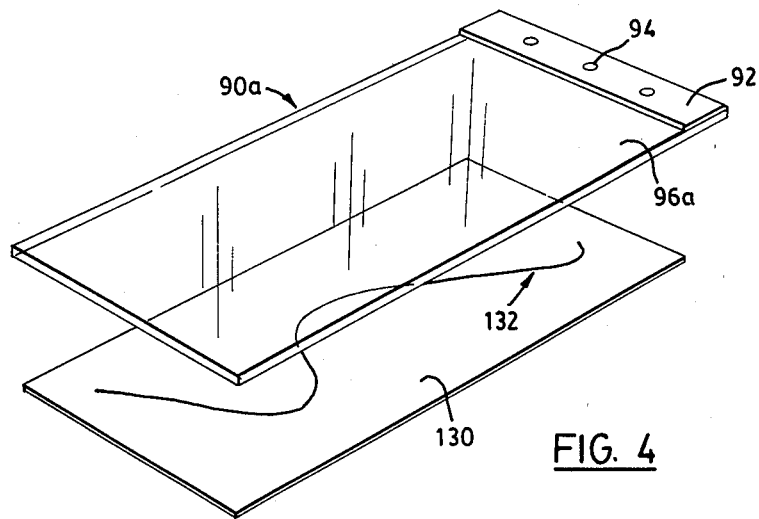
FIG. 4
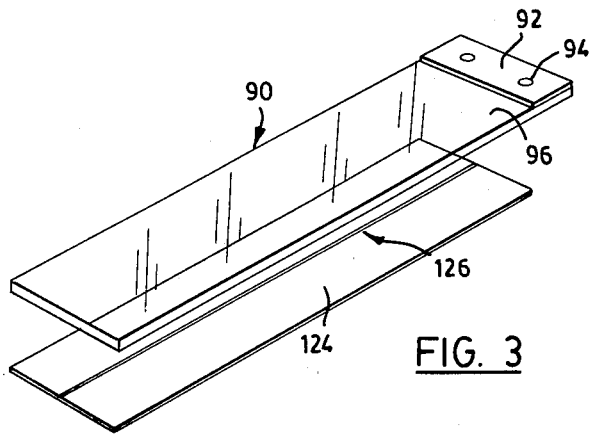
FIG. 3
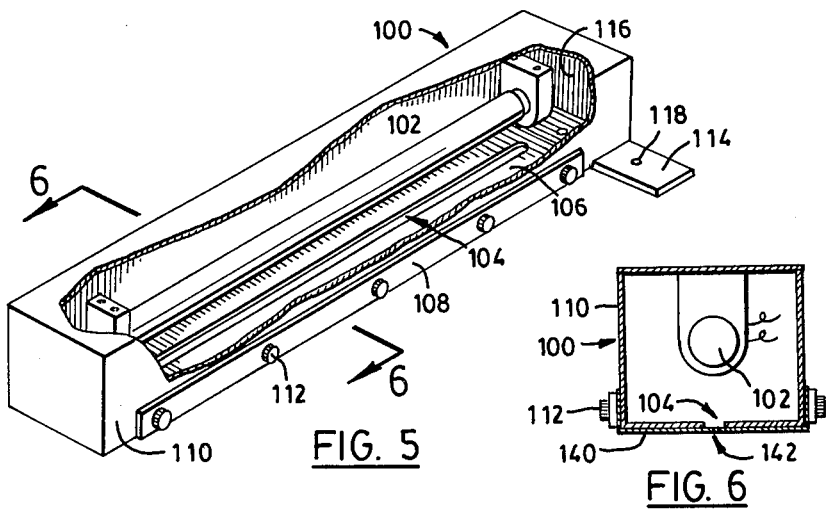
FIG. 5
FIG. 6

(a) HEADLINERS OF CANADA LIMITED
(b) HEADLINERS OF CANADA LIMITED
(c) HEADLINERS OF CANADA LIMITED
(d) *HEADLINERS OF CANADA LIMITED*
(e) HEADLINERS OF CANADA LIMITED
(f) HEADLINERS OF CANADA LIMITED
(g) HEADLINERS OF CANADA LIMITED
(h)    (i) 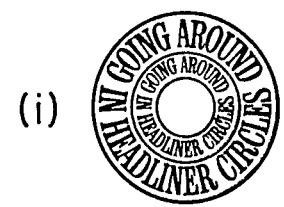
(j) 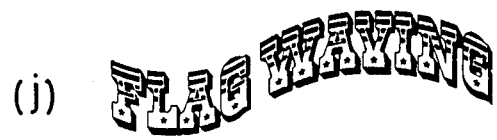
FIG. 8

PHOTOGRAPHIC DISTORTION METHOD AND APPARATUS

FIELD OF THE INVENTION

This invention relates to a method and apparatus for distorting a photographic image, in which an image from a negative film is exposed in altered form on a photosensitive material.

BACKGROUND OF THE INVENTION

Photographic contact devices are presently known which will distort or reproportion an image, such as lettering, by using a negative of the image and projecting light through a slit aperture while moving the negative of the image and a photosensitive sheet. An example of such apparatus is disclosed in U.S. Pat. No. 3,374,724 to Torres issued Mar. 26, 1968. The apparatus of the Torres patent is relatively complex and expensive to construct and operate and the same is true of other, similar devices.

It is an object of the present invention to provide an improved method and apparatus for obtaining a distorted reproduction of a photographic image by moving a negative of the image, together with a slitted mask, across a photosensitive material.

SUMMARY OF THE INVENTION

In its broadest aspect the invention consists of a method of obtaining a distorted photographic reproduction from a negative photographic image, comprising the steps of: attaching a sheet of photosensitive printing paper to a planar surface; locating the negative photographic image over the sheet of printing paper; positioning a mask with an exposure slit transversely over the negative photographic image; and moving the negative laterally with respect to the paper and simultaneously moving the mask and slit laterally with respect to the negative image while exposing the mask and slit to a light source.

Apparatus of the invention comprises: a table having a planar surface for the attachment of a sheet of photosensitive printing paper thereto; at least a first and a second guide mounted on a table, movable linearly in parallel paths; a carrier for the image negative and a carrier for a mask having an exposure slit, each carrier being removably attachable to either guide for movement above the surface of the table and parallel thereto; whereby on relative movement of the guides and the carriers attached thereto beneath a light source a distorted positive image is produced on the photosensitive printing paper attached to the surface of the table.

BRIEF DESCRIPTION OF THE DRAWINGS

A preferred example embodiment of the invention is shown in the accompanying drawings in which:

FIG. 1 is a perspective view, partly broken away, of a photographic distortion apparatus;

FIG. 2 is a cross-section of the turntable of the apparatus of FIG. 1 taken along line 2—2;

FIG. 3 is a perspective view of one carrier used with the apparatus of FIG. 1 together with a linear exposure line negative;

FIG. 4 is a perspective view of a second carrier used with the apparatus of FIG. 1 together with another a contour exposure line negative;

FIG. 5 is a perspective view, partly broken away, showing a light source used with the apparatus of FIG. 1;

FIG. 6 is a cross-sectional view of the light source of FIG. 5 taken along line 6—6;

FIG. 8 shows various images (b) to (j) inclusive which can be formed using the apparatus of FIG. 1;

DETAILED DESCRIPTION OF PREFERRED EMBODIMENT

Figure 7:
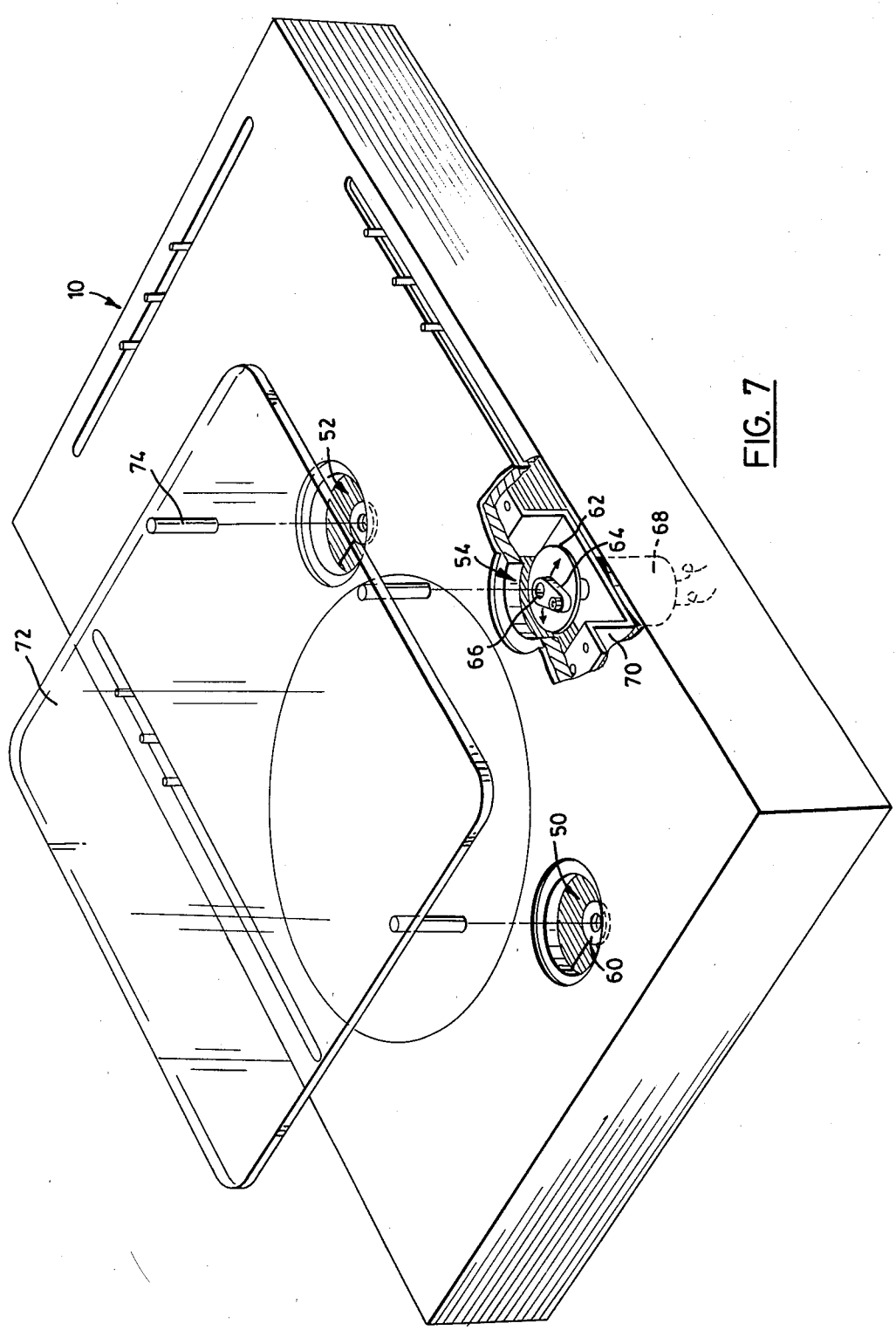
FIG. 7 is a perspective view of the apparatus of FIG. 1 using an occillating carrier.

The example embodiment shown in the drawings consists of a table 10 having a rectangular box frame 12 with a top 14 having an upper planar surface 16. Adjacent three of the four side edges of top 14 are slots 24a, 24b and 24c. Slots 24a and 24b are parallel to one another, while slot 24c is normal thereto.

Guides 30a, 30b and 30c are associated with slots 24a, 24b and 24c respectively. Each guide 30a, 30b, 30c comprises a block member slidable on a guide bar 32 fixed within box 12 and the guide is moved along the guide bar by a stepping motor 34 through a worm screw 36. Guides 30a, 30b and 30c carry rows of pins 38a, 38b and 38c respectively projecting upwardly through associated slot 24a, 24b and 24c.

A large diameter turntable 40 is located off centre in top 14 of box 12 flush with planar surface 16. Turntable 40 is rotatably driven by a stepping motor 42 fixed to the underside of top 14 as seen more particularly in FIG. 2. Three removable discs covers 44, 46 and 48 of smaller diameter are also located in top 14 in box 12 flush with planar surface 16 and planetary to turntable 40. Discs 44, 46 and 48 cover circular access apertures 50, 52 and 54 in top 14 (see FIG. 7). Four idling pulleys 56 are mounted on the underside of top 14 and carry an endless wire 58 which in turn carries a pair of collars 60 one located axially beneath each aperture 50 and 52.

As seen in FIG. 7, a further disc 62 is mounted on the underside of top 14 axially beneath aperture 54. An eccentric arm 64 is adjustably mounted on disc 62 by a bolt 64 and carries an aperture 66 adjacent its free end. Disc 62 is rotatably driven by a motor 68 which is mounted on the underside of top 14, together with the disc, by a flange 70.

A transparent rectangular image negative carrier sheet 72, preferably of clear acrylic plastic material, is mountable on table 10 by means of fixed pins 74 which project downwardly perpendicularly from the sheet.

Pins 74 are receivable by collars 60 and eccentric arm 64 allowing sheet 72 to lie on planar surface 16.

A T-shaped image negative carrier 80, as seen in FIG. 1, is provided which is engagable with pins 38 of guides 30. Carrier 80 comprises a crosshead 82 having a row of apertures 84, and an arm 86 extending perpendicularly from the crosshead.

An exposure line negative carrier 90, as seen in FIG. 3, is also engagable with pins 38 of guide 30. Carrier 90 comprises a crosshead 92 having a row of apertures 94, and a transparent arm 96, for example of acrylic material, extending perpendicularly from the crosshead. A modified carrier 90a having a wider arm 96a, for use with contour exposure line negatives, is shown in FIG. 4.

A light source operable with table 10, as shown in FIGS. 5 and 6, comprises an elongated light impervious exposure box 100 carrying internally a fluorescent light tube 102 with a suitable electrical cord connector (not shown) and having a slot 104 in the bottom 106 of the box, aligned with the light tube. Retainer bars 108 are located one on each side 110 of box 100 adjacent bottom 106 with releasable mounting screws 112. A pair of flanges 114 extending from each side 110 and adjacent one end 116 of box 100 carry apertures 118 engagable with pins 38 of guides 30.

Figure 9:
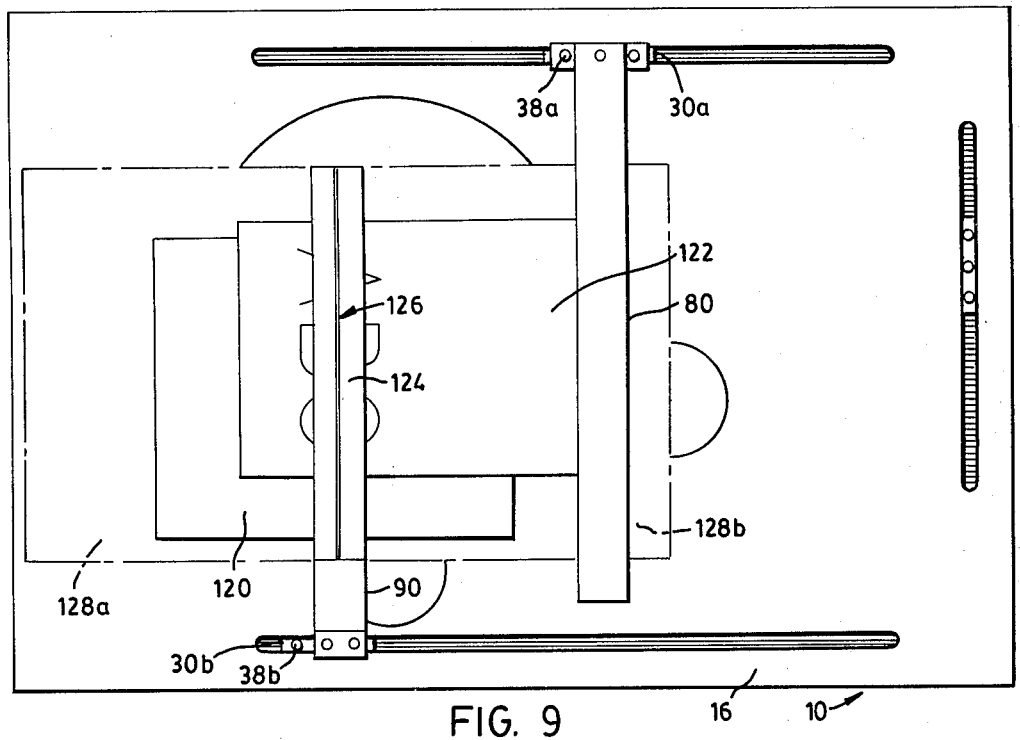
FIG. 9 is a plan view of the apparatus of FIG. 1 showing the apparatus used for elongating or shortening images as shown in FIG. 8 (b) and 8 (c)

In the operation of the preferred embodiment, images of the types shown in FIGS. 8 (b) to (j) inclusive of the drawings may be obtained. FIG. 9 shows the apparatus set up to produce, from image 8(a), an image of elongated height as seen in FIG. 8 (b) or an image of reduced height as seen in FIG. 8 (c). To produce either of these images an unexposed sheet of photosensitive printing paper 120 is mounted on upper surface 16 of table 10, preferably by taping the paper to the surface. A film negative 122 of the image to be reproduced is attached to carrier 80, again preferably by adhesive tape. An exposure negative or mask 124 is mounted on carrier 90, the exposure mask having a straight line exposure slot 126 oriented transversely to the image on negative 122. To prevent the general exposure of film negative 122 to an overhead light source additional masks 128a and 128b may also be attached to the sides of carrier 90 although of course exposure mask 124 may be extended to perform this purpose. Carriers 80 and 90 are mounted on parallel guides 30a and 30b respectively by engaging pins 38a and 38b in apertures 84 of crossheads 82. Guides 30a and 30b are then driven to move carriers 80 and 90 laterally in the same direction while light is projected through slit 126. To elongate or increase the height of the image of film negative 122 as seen in FIG. 8 (b), carrier 90 is moved laterally at a greater speed than carrier 80 while to condense or reduce the height of the image as seen in FIG. 8 (c) it is necessary to move carrier 90 laterally at less speed than carrier 80. The relative speeds of carriers 80 and 90 will determine the amount of elongation or condensation of the image transferred to image negative 122. Exposure times will depend, of course, on the type of film negative used.

Figure 10:
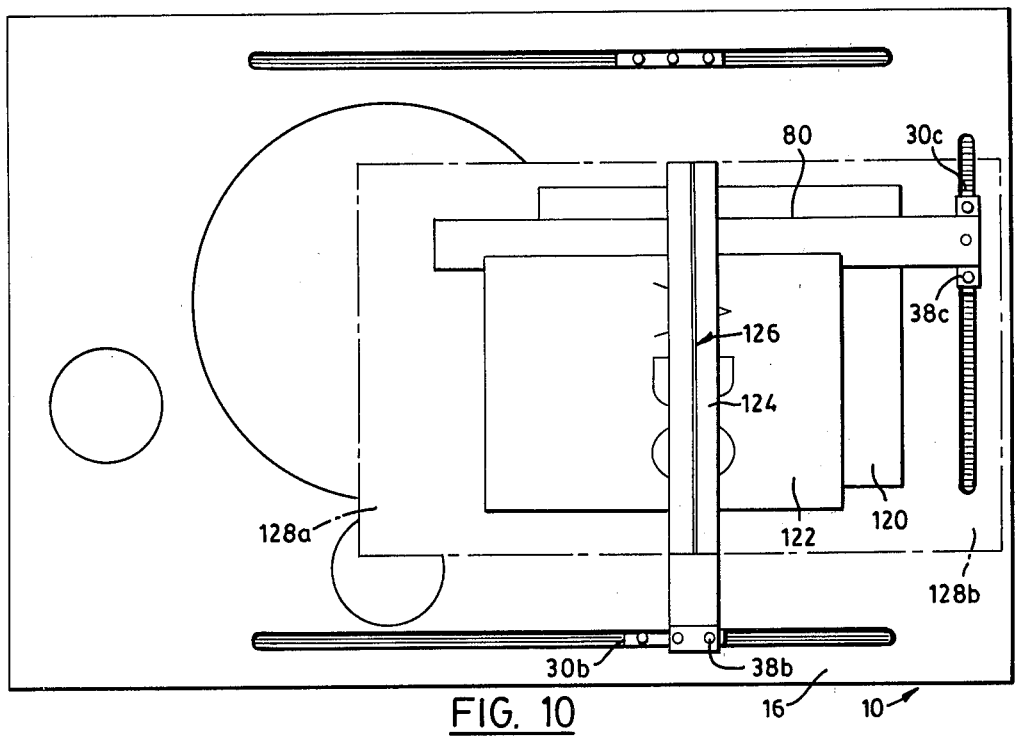
FIG. 10 is a view similar to FIG. 9 showing the apparatus used for use in forming italicized or backslanted images as shown in FIG. 8 (d) or 8 (e)

In FIG. 10 the apparatus is set up to produce from FIG. 8 (a), the slanted image of FIG. 8 (d) or 8 (e). In this arrangement image negative 122 is attached by carrier 80 by means of pins 38C to guide 30C and exposure mask 124 is attached by carrier 90 by means of pins 38b to guide 30b with straight slit 126 transverse to the image on negative 124. As before, photosensitive paper 120 is attached to upper surface 16 of table 10. Guides 30b and 30c are driven to move carriers 80 and 90 laterally to produce a slanted image on negative 120. The direction and the degree of slant of the image transferred to negative 120 will be governed by the relative speeds and directions of travel of carriers 80 and 90.

Figure 11:
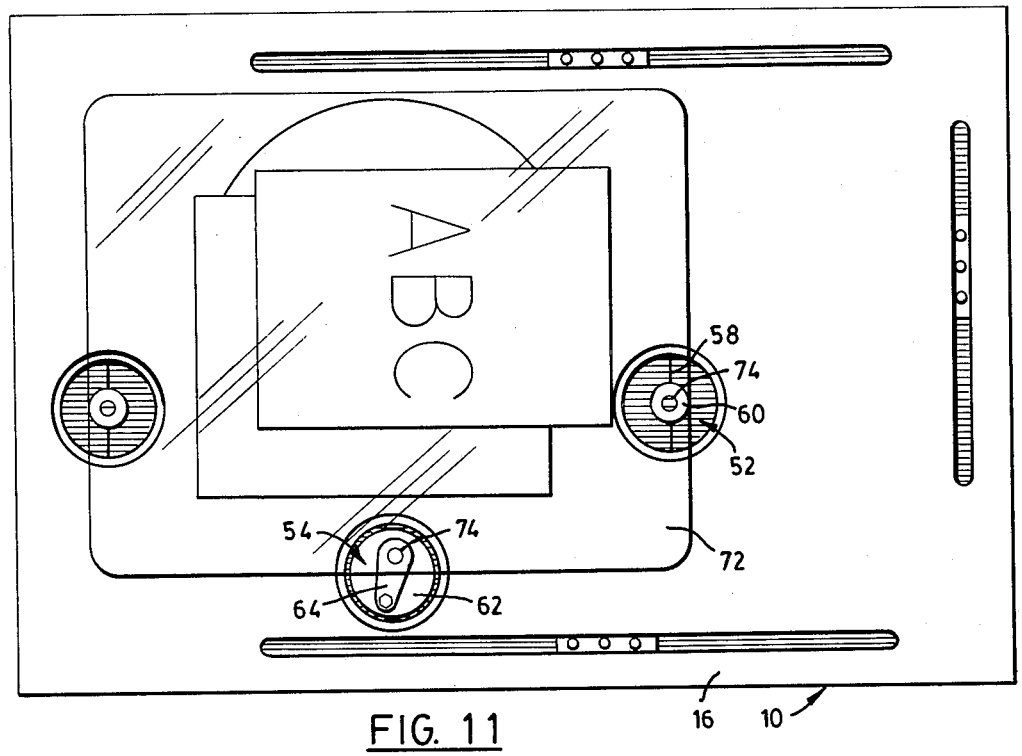
FIG. 11 is another view similar to FIG. 9 showing the apparatus for use in forming outlines and inlines of images as shown in FIG. 8 (f) and 8 (g)

Outline images, for example as seen in FIGS. 8 (f) and 8 (g) of the drawings, are reproducable using the apparatus as set up in FIG. 11. In this arrangement photosensitive paper 120 is attached to upper surface 16 of table 10, as before. Image negative 122 is attached to carrier sheet 72 which engages washers 60 and eccentric arm 64 by pins 74 as seen in FIG. 7. Carrier sheet 72 is orbited without rotation, by rotating eccentric disc 62 to produce a positive image on paper 120 which is larger than the original image. A positive is then made from negative 122 and a negative is made from positive 120. By registering the smaller positive image inside the larger negative image an outline is formed and from this montage a contact print is made. It will be appreciated that the corners of the larger image of positive 120 will be rounded because the image has been produced by orbiting negative 122 and therefore it is necessary to reconstitute the corners of the image of positive 120 by manually retouching them. To produce an outline the same size or smaller than the original image, called an inline, it is necessary first to reduce the image in size and then make a negative 122 of it, after which the same steps are taken as outlined immediately above. An image of the type shown in FIG. 8 (g) is obtained by sliding the negative of the outline diagonally with respect to film negative.

Figure 12:
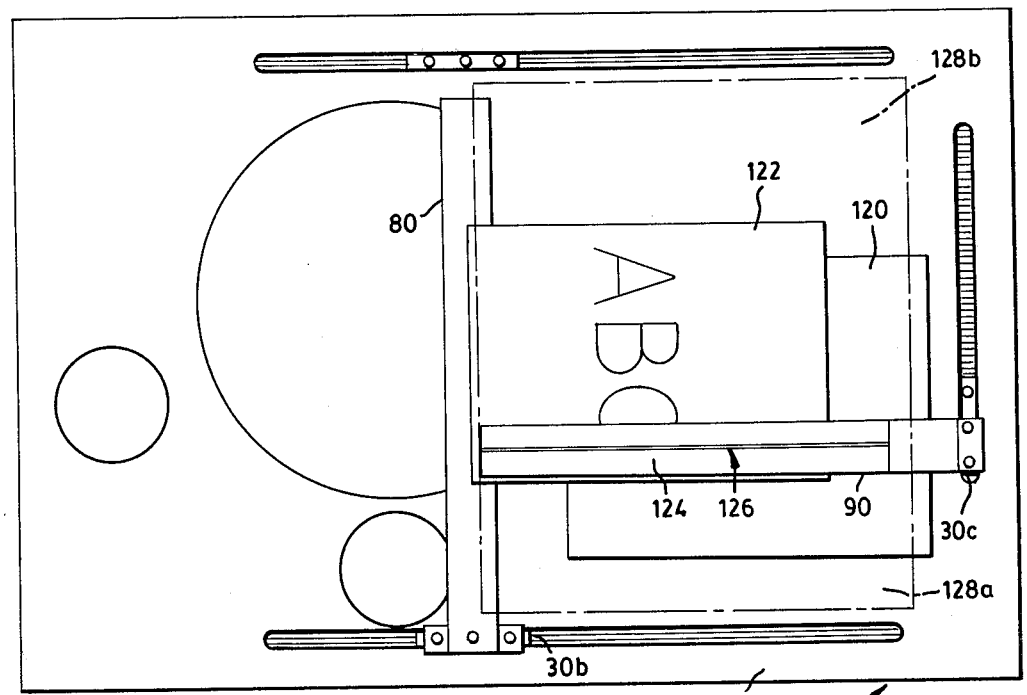
FIG. 12 is another view similar to FIG. 9 showing the apparatus for use in forming perspectives of images as shown in FIG. 8 (h)

Perspectives of images, for example as shown in FIG. 8 (h) of the drawings, may be produced by the apparatus of the invention when set up in the manner of FIG. 12. Photosensitive paper 120 is attached to upper surface 16 of table 10 and image negative 122 is attached to carrier 80, while exposure mask 124, together with additional masks 128 if necessary, is attached to carrier 90. Carriers 80 and 90 are mounted on guides 30b and 30c respectively. To obtain a perspective image on print paper 120, image negative 122 is moved by guide 30b at an increasing or decreasing speed while slit 126 is moved by guide 30c across the image negative. For a straight line perspective, slit 126 would be moved at a uniform acceleration while to produce a curved perspective as seen in FIG. 8 (h), slit 126 would be moved at an varying acceleration across image negative 122.

Figure 13:
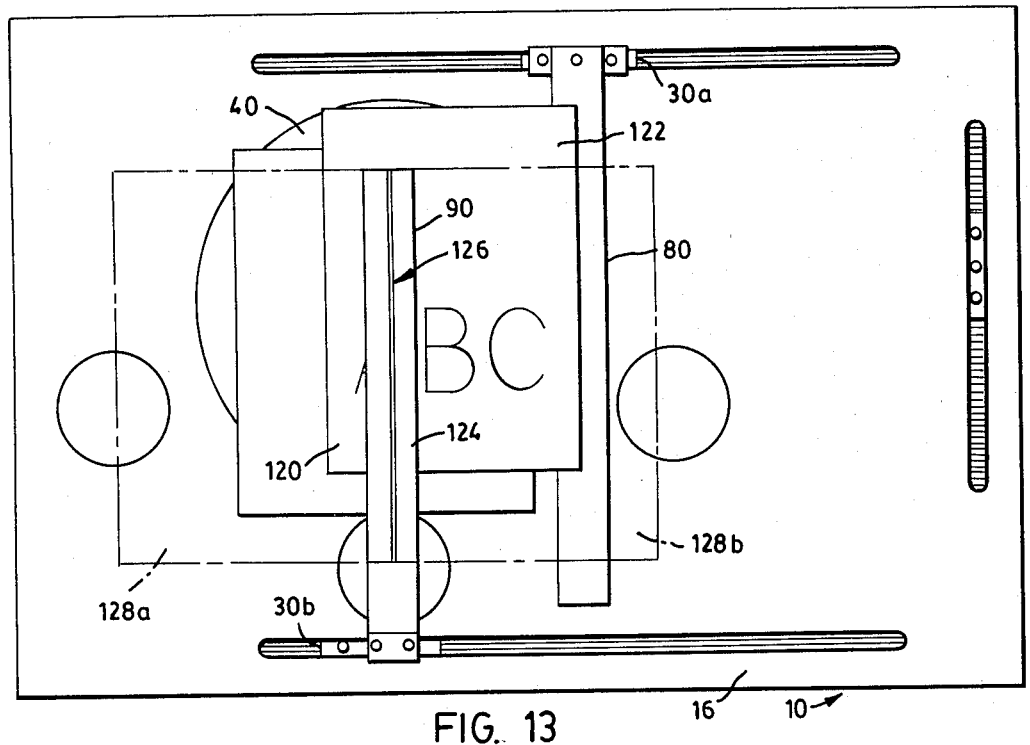
FIG. 13 is another view similar to FIG. 9 showing the apparatus for use in forming circles of images as shown in FIG. 8 (i)

Circles of images, such as that shown in FIG. 8 (i) are obtainable using the set up of FIG. 13. Printing paper 120 is taped to turntable 40. Image negative 122 is attached to carrier 80 which is mounted on guide 30a. Exposure mask 124, together with masks 128 if necessary, is attached to carrier 90 which is mounted on guide 30b, with slit 126 being located over a centre line of turntable 40. During exposure, turntable 40 is rotated while image negative 122 is drawn across print paper 120 by guide 30a. The diameter of the printed circular image is determined by the radial distance of negative image 122 from the centre of turntable 40. The speed of travel of negative image 122 determines the accurate length of the printed image.

Figure 14:
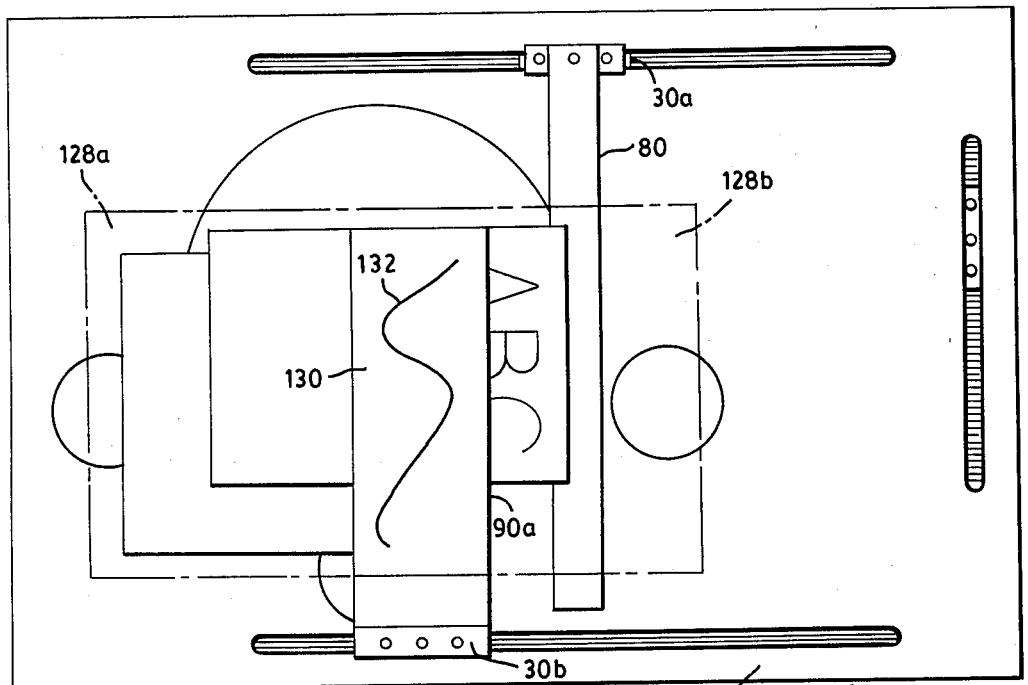
FIG. 14 is another view similar to FIG. 9 showing the apparatus for use in forming curved images as shown in FIG. 8 (j).

Other curves or contours of printed images, for example as shown in FIG. 8 (j), may be obtained using the apparatus of the invention set up as shown in FIG. 14. In this use of the apparatus an exposure mask 130 is employed with a slit 132 specifically curved or contoured to provide a printed image of a predetermined configuration. The set up of the materials is similar to that of FIG. 9 with printing paper 120 being attached to surface 16 of table 10 and image negative 122 being attached to carrier 80 mounted on guide 30a. Exposure mask 130 is attached to carrier 90a along with additional mask 128 if necessary (see FIG. 4) and carrier 90 is mounted on guide 39b. The image from negative 122, contoured as in mask 130, is printed on paper 120 by moving guide 30a, the contour of the printed image being reversed from that of mask 130. A reduced or amplified printed image will be obtained, depending upon the speed at which image negative 122 and mask 130 are advanced.

Exposure box 100 may be used in place of mask 124 and an overhead light source. As seen in FIG. 6, a mask 140 having a straight exposure slit 142 is mounted on the underside of bottom 106 by screws 112 with the slit registering with slot 104. Exposure box 100 is then mounted on the appropriate guide 30 by engaging pins 38 in apertures 118 of the box and tube 102 is plugged into an electrical outlet.

I claim:

1. A method of obtaining a distorted photographic reproduction from a negative photographic image, comprising the steps of:
   attaching a sheet of photosensitive printing paper to a planar surface;
   locating the negative photographic image over the sheet of printing paper;
   positioning a mask with an exposure slit transversely over the negative photographic image; and
   moving the negative laterally with respect to the paper and simultaneously moving the mask and slit laterally with respect to the negative image while exposing the mask and slit to a light source.

2. A method as claimed in claim 1 in which the negative image and the slit are moved in the same direction but at different speeds.

3. A method as claimed in claim 1 in which the negative image is moved in a direction transverse to the direction of movement of the slit.

4. A method as claimed in claim 1, 2 or 3 in which the slit is straight.

5. A method as claimed in claim 2 in which the slit is undulated.

6. Apparatus for obtaining a distorted reproduction from a negative photographic image, comprising:
   a table having a planar surface for the attachment of a sheet of photosensitive printing paper thereto;
   at least a first and a second guide mounted on the table, the guides being movable linearly in parallel paths;
   a carrier for the image negative and a carrier for a mask having an exposure slit, each carrier being removably attachable to either guide for movement above the surface of the table and parallel thereto;
   whereby on relative movement of the guides and the carriers attached thereto beneath a light source a distorted positive image is produced on the photosensitive printing paper attached to the surface of the table.

7. Apparatus as claimed in claim 6 including a third guide mounted on the table and movable linearly in a path transverse to the paths of the first and second guides, each carrier being removably attachable to the third guide for movement above the surface of the table and parallel thereto.

8. Apparatus as claimed in claim 6 in which each guide comprises a block member slidable along a guide bar and a drivable worm screw engaging the block member, a row of spaced pins projecting upwardly from each block member above the planar surface of the table, each carrier including a row of apertures for receiving the pins.

9. Apparatus as claimed in claim 6 in which each guide comprises a block member slidable along a guide bar and a drivable worm screw engaging the block member, a row of spaced pins projecting upwardly from each block member above the planar surface of the table, each carrier including a row of apertures for receiving the pins.

10. Apparatus as claimed in claim 8 or claim 9 in which the carrier for the mask comprises an exposure box having an underside carrying a mask with an exposure slit and containing therein a light source.

* * * * *